United States Patent [19]

Seymour

[11] Patent Number: 5,759,850
[45] Date of Patent: Jun. 2, 1998

[54] AIR DIFFUSER FOR ROTARY COMPOSTERS

[75] Inventor: Shaun A. Seymour, New Holland, Pa.

[73] Assignee: New Holland North America, Inc., New Holland, Pa.

[21] Appl. No.: 660,138

[22] Filed: Jun. 7, 1996

[51] Int. Cl.⁶ .................................................. C12M 3/00
[52] U.S. Cl. ........................................ 435/290.3; 435/290.4
[58] Field of Search ........................... 435/290.1, 290.2, 435/290.3, 290.4

[56] References Cited

U.S. PATENT DOCUMENTS

| | | | |
|---|---|---|---|
| 1,518,938 | 12/1924 | Nielsen | 34/137 |
| 3,054,663 | 9/1962 | Komline | 23/259 |
| 3,178,267 | 4/1965 | Larson | 422/233 |
| 3,676,074 | 7/1972 | Shibayama | 435/312 |
| 4,313,721 | 2/1982 | Henriques | 431/265 |
| 4,522,151 | 6/1985 | Arbisi et al. | 119/3 |
| 5,047,349 | 9/1991 | Eweson | 435/312 |
| 5,169,782 | 12/1992 | Murphy et al. | 435/312 |
| 5,300,438 | 4/1994 | Augspurger | 435/312 |
| 5,407,809 | 4/1995 | Finn | 435/41 |

Primary Examiner—David A. Redding
Attorney, Agent, or Firm—Larry W. Miller; John W. Stader; Frank A. Seemar

[57] ABSTRACT

An air diffuser apparatus is provided for a rotary composter in which the air diffuser is constructed in a conical shape to provide a large area for the dissipation of air into the discharge end of the composter vessel. The surface of the air diffuser is provided with a plurality of holes therethrough for the passage of air into the discharge compartment. The air infeed port terminates within the air diffuser to discharge air directly therein. The sloped surface of the conical shape of the air diffuser permits any material engaging therewith to fall from the diffuser surface and prevents the diffuser from plugging with material.

9 Claims, 14 Drawing Sheets

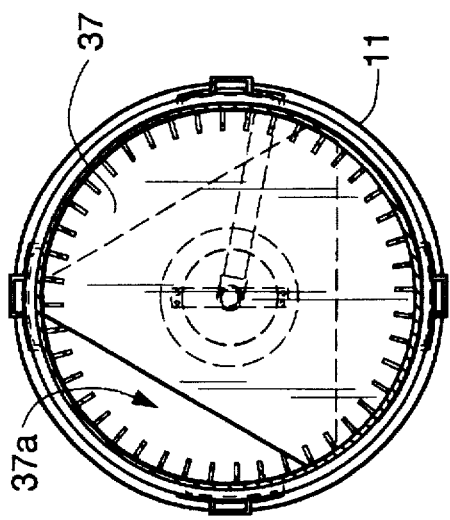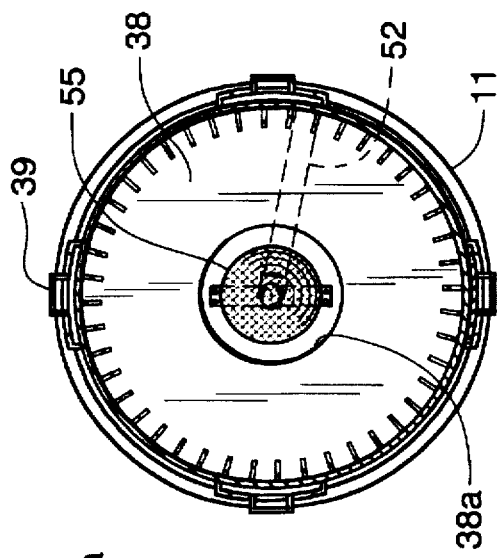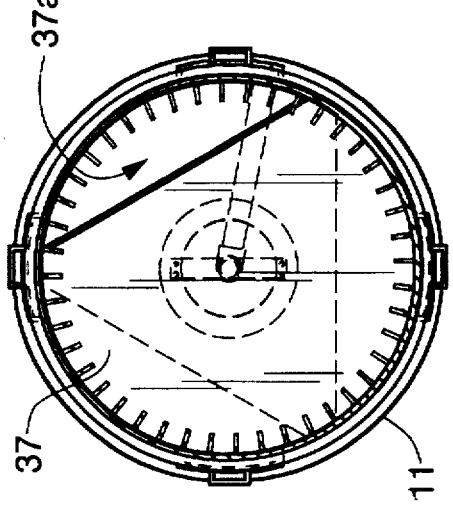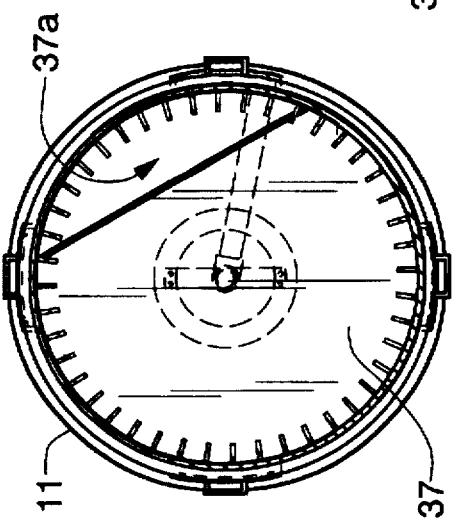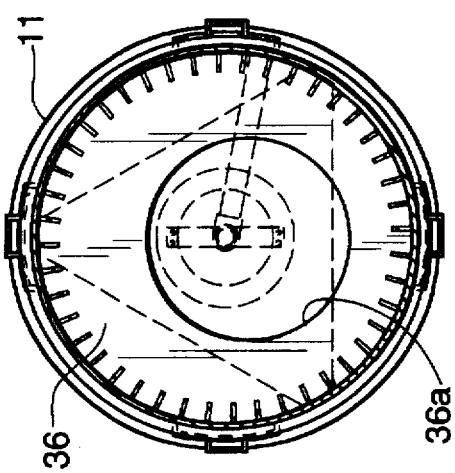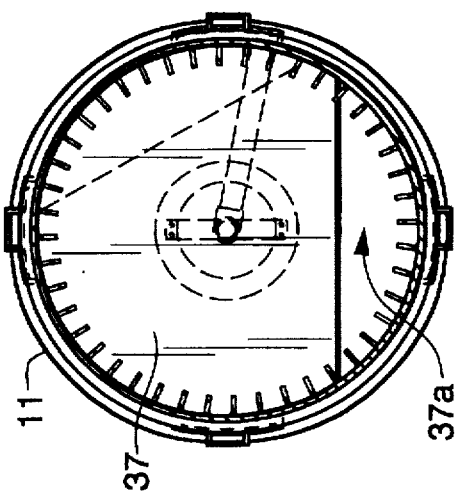

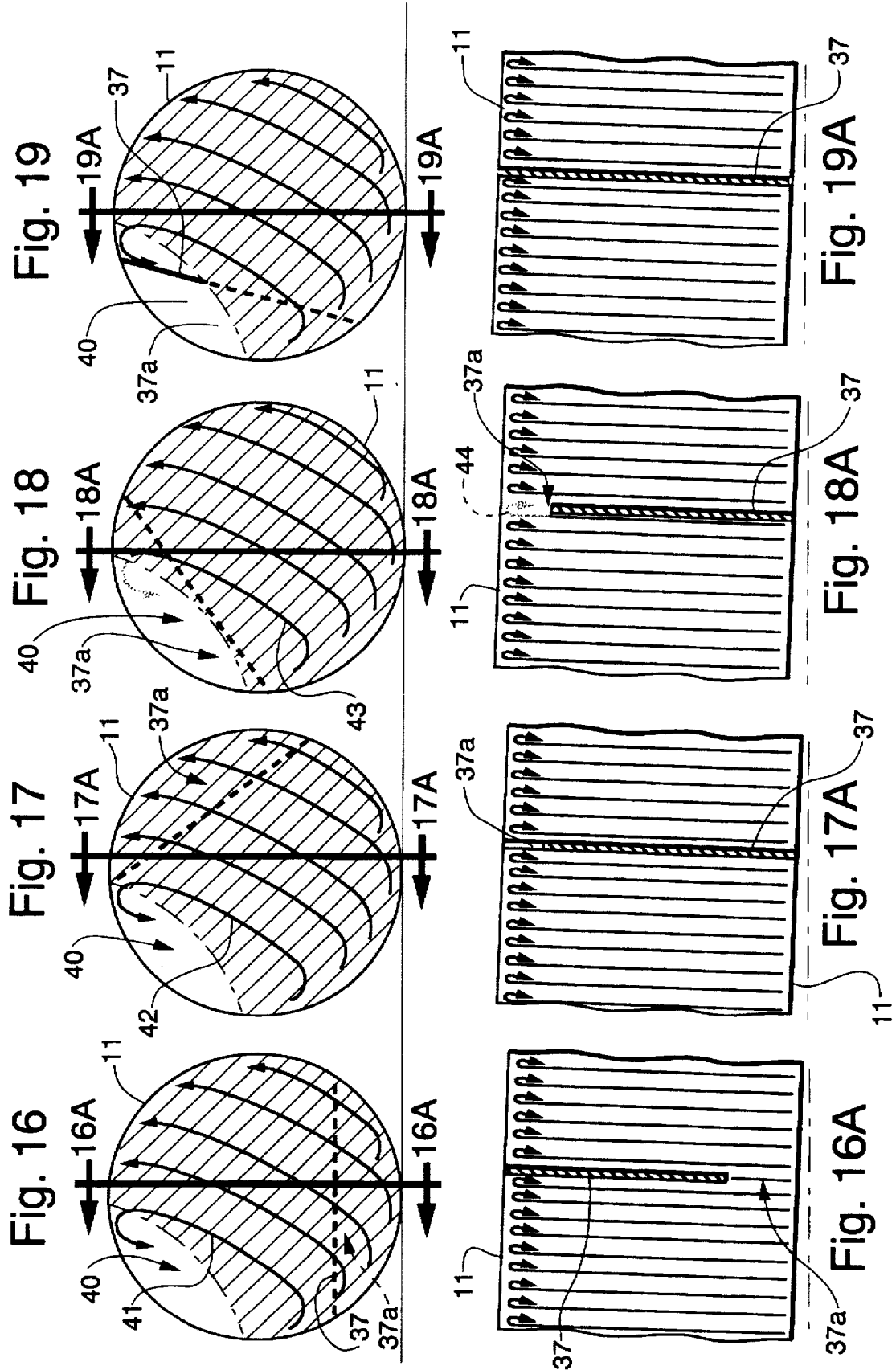

5,759,850

AIR DIFFUSER FOR ROTARY COMPOSTERS

BACKGROUND OF THE INVENTION

This invention relates generally to a machine for creating compost from waste material, such as manure and biodegradable garbage, and more particularly, to an air infeed apparatus for facillitating the biological degradation of organic waste materials within the composter.

Rotary composters are well known in the art, as is represented by U.S. Pat. No. 5,407,809, issued to Larry J. Finn on Apr. 18, 1995. The process achieves an accelerated biological degradation of the waste material to create compost therefrom. While any biodegradable material can be digested within the rotary composter, farm wastes, such as animal manure, are of particular interests because of the desire to fix the nitrogen within the material to prevent stream pollution when the composted waste is spread onto the ground.

Present day manure handling techniques typically provide for a collection of the manure until weather and ground conditions are acceptable to permit the raw manure to be spread over the fields. Since the nitrogen within the raw manure has not been fixed, any runoff, such as would occur following a storm, would have the potential for polluting the streams. Furthermore, free nitrogen in the form of nitrates can leach into the ground water supply and cause pollution. Accordingly, non-point sources of pollution, such as farming operations, have come under scrutiny with respect to manure handling.

The biggest problem with known rotary composters has been effective operation. The vessel is preferably sized to process the waste material within approximately three days. While the loading of waste material into the infeed end of the apparatus may be substantially continuous, actually on a periodic basis during the day, compost could be discharged in the same manner. Accordingly, the vessel must be designed to retard material flow through the vessel so that the material can be retained for at least three days. An adequate air supply must be provided through the vessel, as the biological degradation process is aerobic in nature, and the vessel must be designed to maintain a temperature of approximately 120 to 160 degrees fahrenheit, even in cold weather operation.

It would, therefore, be desirable to provide for design improvements for such rotary composters to enable an efficient supply of air through the composter during operation of the apparatus under a variety of operating conditions.

SUMMARY OF THE INVENTION

It is an object of this invention to overcome the aforementioned disadvantages of the prior art by providing an air diffuser for a rotary composter to facilitate the flow of air and enhance the efficiency of operation.

It is another object of this invention to provide a rotary composter with diffuser cone to enhance the flow of air into a rotaty composter.

It is a feature of this invention that the conical shape of the air diffuser presents a sloped surface to the material within the composter to facilitate the removal of material from the diffuser surface.

It is an advantage of this invention that the flow of ambient air through the composter vessel is enhanced.

It is another advantage of this invention that the air infeed mechanism is clear from plugging from material within the composter vessel.

It is another object of this invention that the air infeed mechanism is placed at the discharge end of the composter vessel so that the flow of air through the vessel is opposite to the flow of material from the infeed end to the discharge end of the vessel.

It is another advantage of this invention that the diffuser cone provides an increased area over which the inlet air can be introduced into the rotary composter.

These and other objects, features and advantages are accomplished according to the instant invention by providing an air diffuser apparatus for a rotary composter in which the air diffuser is constructed in a conical shape to provide a large area for the disipation of air into the discharge end of the composter vessel. The surface of the air diffuser is provided with a plurality of holes therethrough for the passage of air into the discharge compartment. The air infeed port terminates within the air diffuser to discharge air directly therein. The sloped surface of the conical shape of the air diffuser permits any material engaging therewith to fall from the diffuser surface and prevents the diffuser from plugging with material.

BRIEF DESCRIPTION OF THE DRAWINGS

The advantages of this invention will be apparent upon consideration of the following detailed disclosure of the invention, especially when taken in conjunction with the accompanying drawings wherein:

FIG. 10 is a cross-sectional view of the rotary composter vessel taken along lines 10—10 of FIG. 7 to depict the first weir baffle between the infeed compartment and the first digesting compartment;

FIG. 11 is a cross-sectional view of the rotary composter vessel taken along lines 11—11 of FIG. 7 to depict the baffle between the first and second digesting compartments;

FIG. 12 is a cross-sectional view of the rotary composter vessel taken along lines 12—12 of FIG. 7 to depict the baffle between the second and third digesting compartments;

FIG. 13 is a cross-sectional view of the rotary composter vessel taken along lines 13—13 of FIG. 7 to depict the baffle between the third and fourth digesting compartments;

FIG. 14 is a cross-sectional view of the rotary composter vessel taken along lines 14—14 of FIG. 7 to depict the baffle between the fourth and fifth digesting compartments;

FIG. 15 is a cross-sectional view of the rotary composter vessel taken along lines 15—15 of FIG. 7 to depict the last weir baffle between the fifth and last digesting compartment and the discharge compartment;

FIG. 16 is a schematic depiction of the movement of the material within the rotary composter vessel relative to a baffle, as viewed at the cross-section of the vessel, the passageway past the baffle being located at the bottom of the vessel as indicated by the broken line;

FIG. 16A is a schematic depiction of the movement of the material within the rotary composter relative to a baffle as viewed along lines 16A—16A of FIG. 16;

FIG. 17 is a schematic depiction of the movement of the material within the rotary composter vessel relative to a baffle, as viewed at the cross-section of the vessel, the passageway past the baffle being located at the upper right quadrant of the vessel cross-section as indicated by the broken line;

FIG. 17A is a schematic depiction of the movement of the material within the rotary composter relative to a baffle as viewed along lines 17A—17A of FIG. 17;

FIG. 18 is a schematic depiction of the movement of the material within the rotary composter vessel relative to a baffle, as viewed at the cross-section of the vessel, the passageway past the baffle being located at the upper left quadrant of the vessel cross-section as indicated by the broken line;

FIG. 18A is a schematic depiction of the movement of the material within the rotary composter relative to a baffle as viewed along lines 18A—18A of FIG. 18;

FIG. 19 is a schematic depiction of the movement of the material within the rotary composter vessel relative to a baffle, as viewed at the cross-section of the vessel, the passageway past the baffle being located substantially along the left side of the vessel cross-section as indicated by the broken line;

FIG. 19A is a schematic depiction of the movement of the material within the rotary composter relative to a baffle as viewed along lines 19A—19A of FIG. 19;

DETAILED DESCRIPTION OF THE PREFERRED EMBODIMENT

Figure 1:
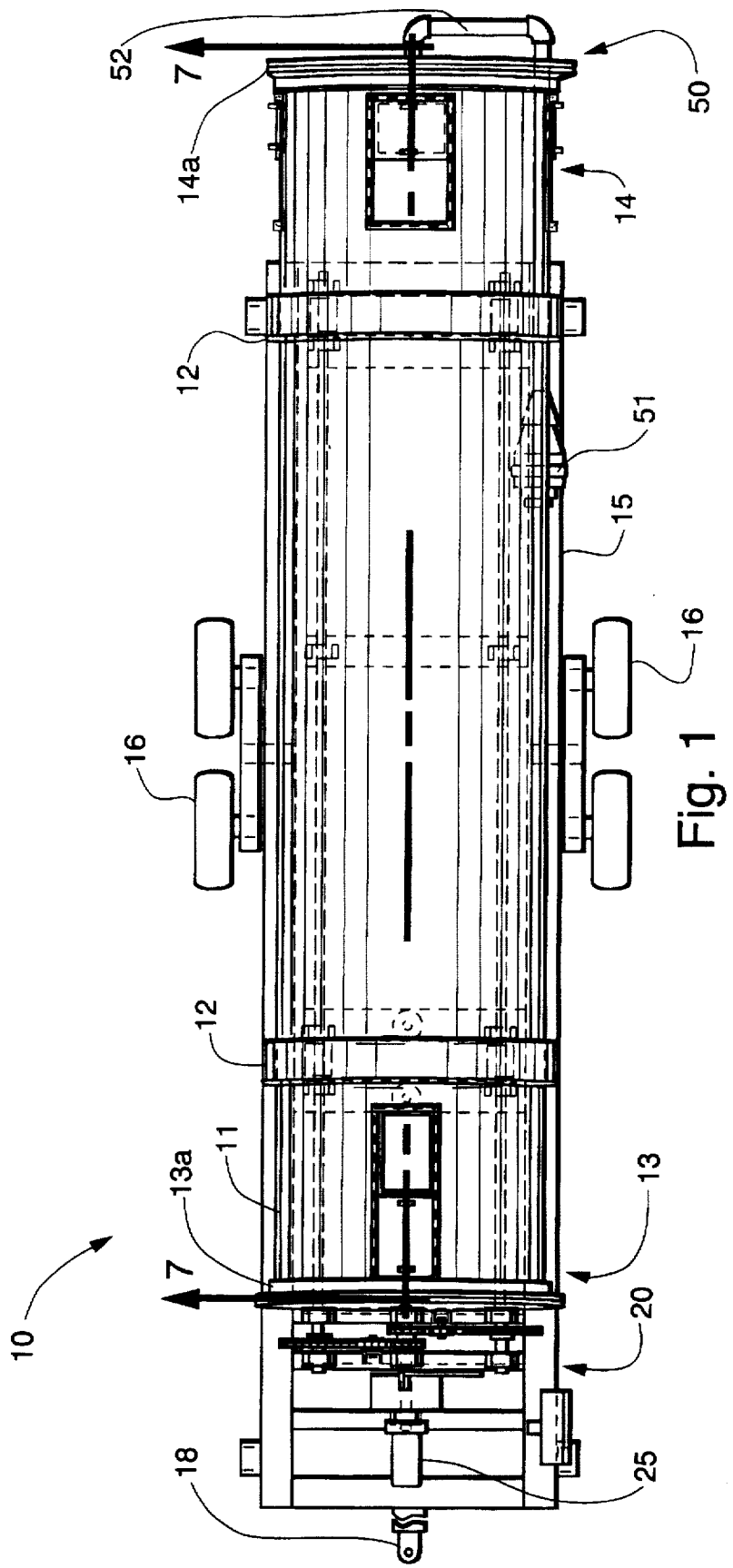
FIG. 1 is a top plan view of the rotary composter incorporating the principles of the instant invention, the cylindrical vessel being mounted on a mobile trailer frame having a portion of the draw bar broken away for purposes of clarity.
Figure 2:
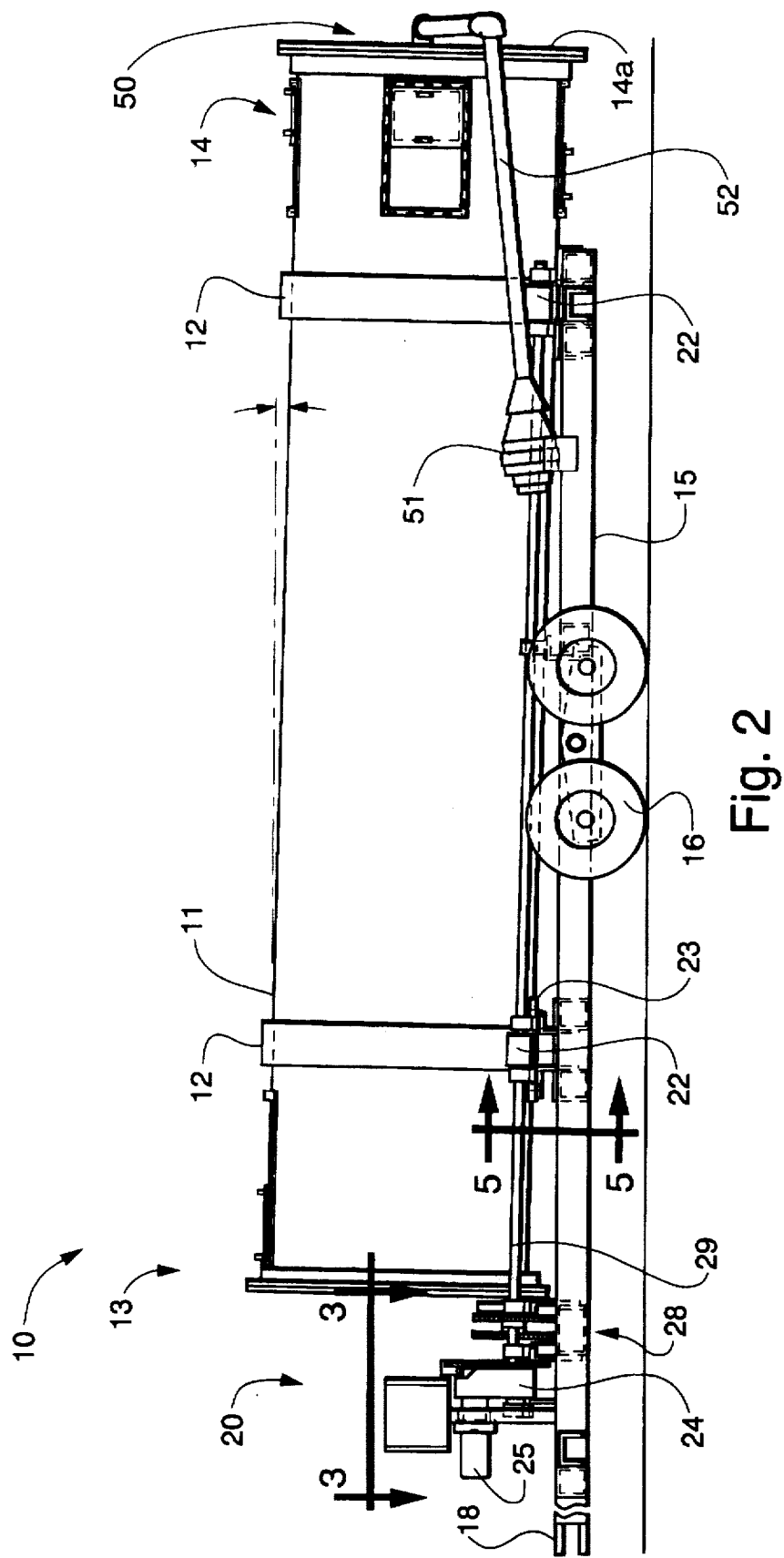
FIG. 2 is a side elevational view of the rotary composter shown in FIG. 1.
Figure 3:
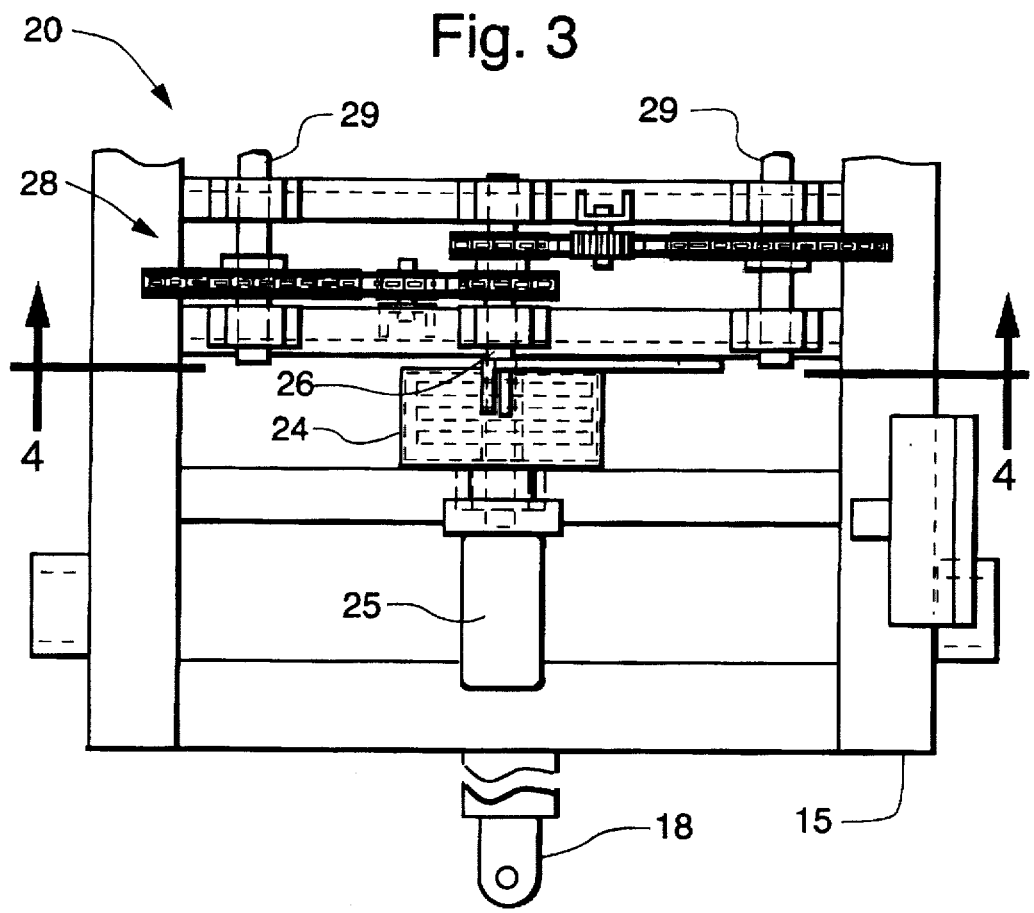
FIG. 3 is an enlarged top plan view of the drive mechanism located at the infeed end of the rotary composter, corresponding to lines 3—3 of FIG. 2.
Figure 4:
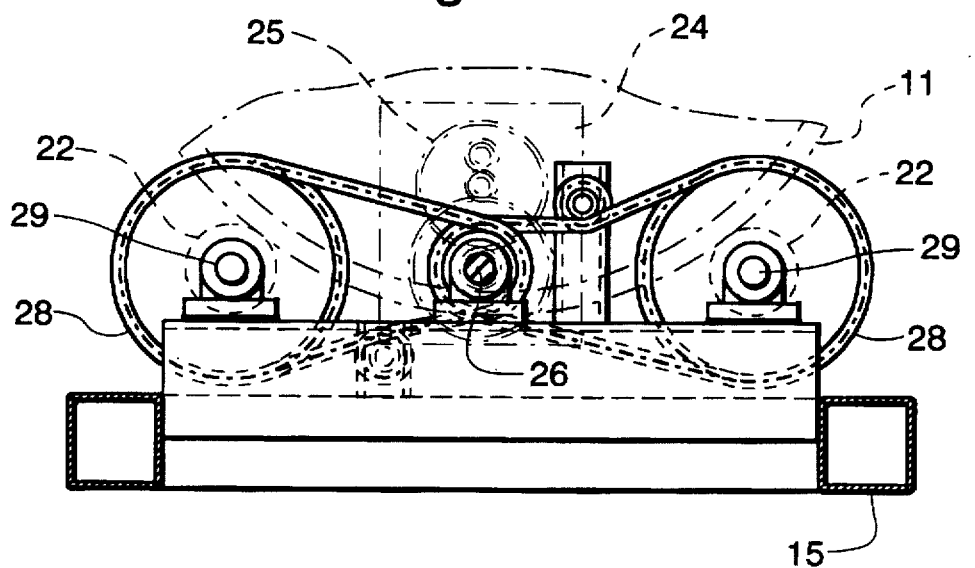
FIG. 4 is a partial cross-sectional view of the drive mechanism corresponding to lines 4—4 of FIG. 3, the vessel being shown in phantom.
Figure 5:
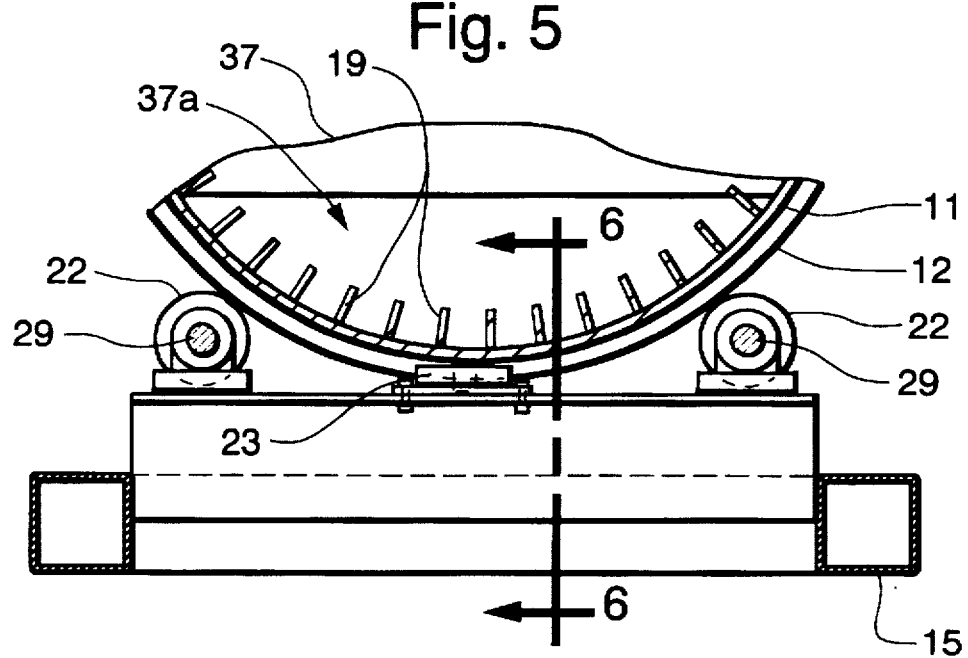
FIG. 5 is an enlarged partial cross-sectional view of the rotary composter corresponding to lines 5—5 of FIG. 2 to depict the rotational support of and the rotational drive rollers for the vessel on the mobile trailer frame, most of the vessel structure being broken away for purposes of clarity.

Referring now to the drawings and, particularly, to FIGS. 1 and 2, the rotary composter incorporating the principles of the instant invention can best be seen. Left and right references are used as a matter of convenience and are determined by standing at the infeed end of the cylindrical vessel at the location of the drive mechanism and facing the remote discharge end thereof.

The rotary composter 10 is constructed as a generally cylindrical drum-like vessel 11 rotatably supported on a wheeled trailer frame 15 having a set of wheels 16 to permit movement of the composter 10 over the ground G and a hitch member 18 to connect the trailer frame 15 to a prime mover. One skilled in the art will readily realize that the mobility enabled by the wheeled trailer frame 15 is not a critical factor of the instant invention, as the wheels 16 need to be removed from the frame 15 when the composter 10 is set up for operation to provide proper leveling and more stability for the operation of the composter 10.

The frame 15 does provide a support for the rotation of the drum 11, as will be described in greater detail below, and further supports the drive mechanism 20. The vessel 11 is inclined downwardly on the frame 15 from the inlet or infeed end 13 toward the discharge end 14, preferably at an angle of approximately one and a half degrees from horizontal. Preferably, the exterior circumference of the vessel 11, except for the traction bands 12, is covered with a layer of polyurethane foam (not shown) to insulate the vessel 11 and retain heat generated by the composting process within the interior of the vessel 11.

Referring now to FIGS. 1–6, the drive mechanism 20 can best be seen. The vessel 11 includes a pair of longitudinally spaced traction bands 12 extending around the outer circumference of the vessel 11. The frame 15 supports a pair of transversely spaced drive rollers 22, best seen in FIGS. 4 and 5, engaged with each of the traction bands 12 to effect rotation of the vessel 11. The drive mechanism 20 further includes a motor 25, preferably electrical, although other primary drive members, such as a hydraulic motor, could be equally used. The output shaft 26 from the motor 25 is operably coupled to a reduction gear box 24 and a pair of chain drives 28 that effect rotation of a corresponding pair of drive shafts 29 connected to the drive rollers 22 to effect the final output speed of rotation of the vessel 11 at approximately one half of a revolution per minute or less.

Figure 6:
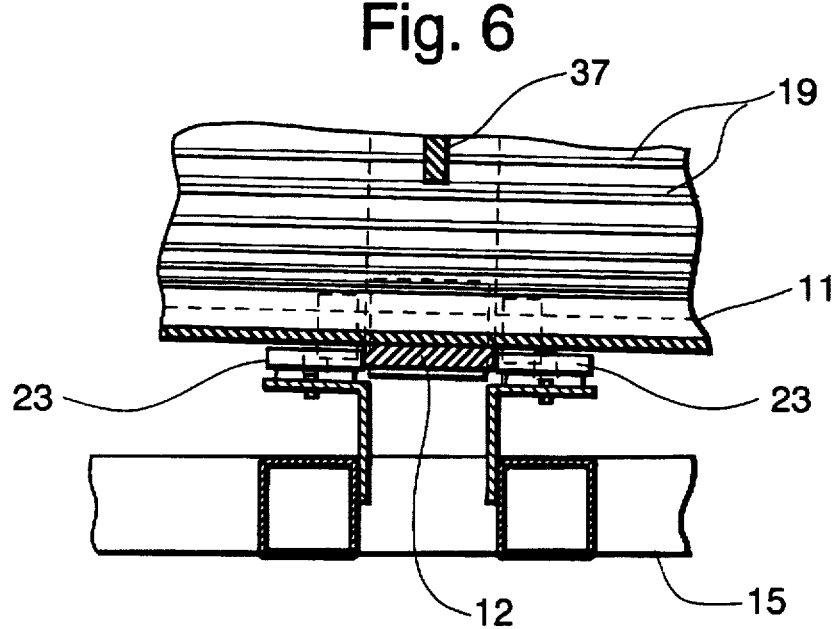
FIG. 6 is a partial cross-sectional view of the rotary composter corresponding to lines 6—6 of FIG. 5 to depict the thrust bearing arrangement rotatably supporting the vessel on the mobile trailer frame.

Preferably, the motor 25 is variable in speed so that the speed of rotation of the vessel 11 can be varied within the range of two and a half minutes per revolution to approximately thirteen minutes per revolution of the vessel 11. Since the vessel 12 is inclined relative to horizontal so that the rotation of the vessel 12 will move material within the vessel toward the discharge end 14, each traction band 12 is captured by a thrust bearing 23, as best seen in FIG. 6, supported by the frame 15 to prevent longitudinal displacement of the vessel 12 relative to the frame 15.

Figure 7:
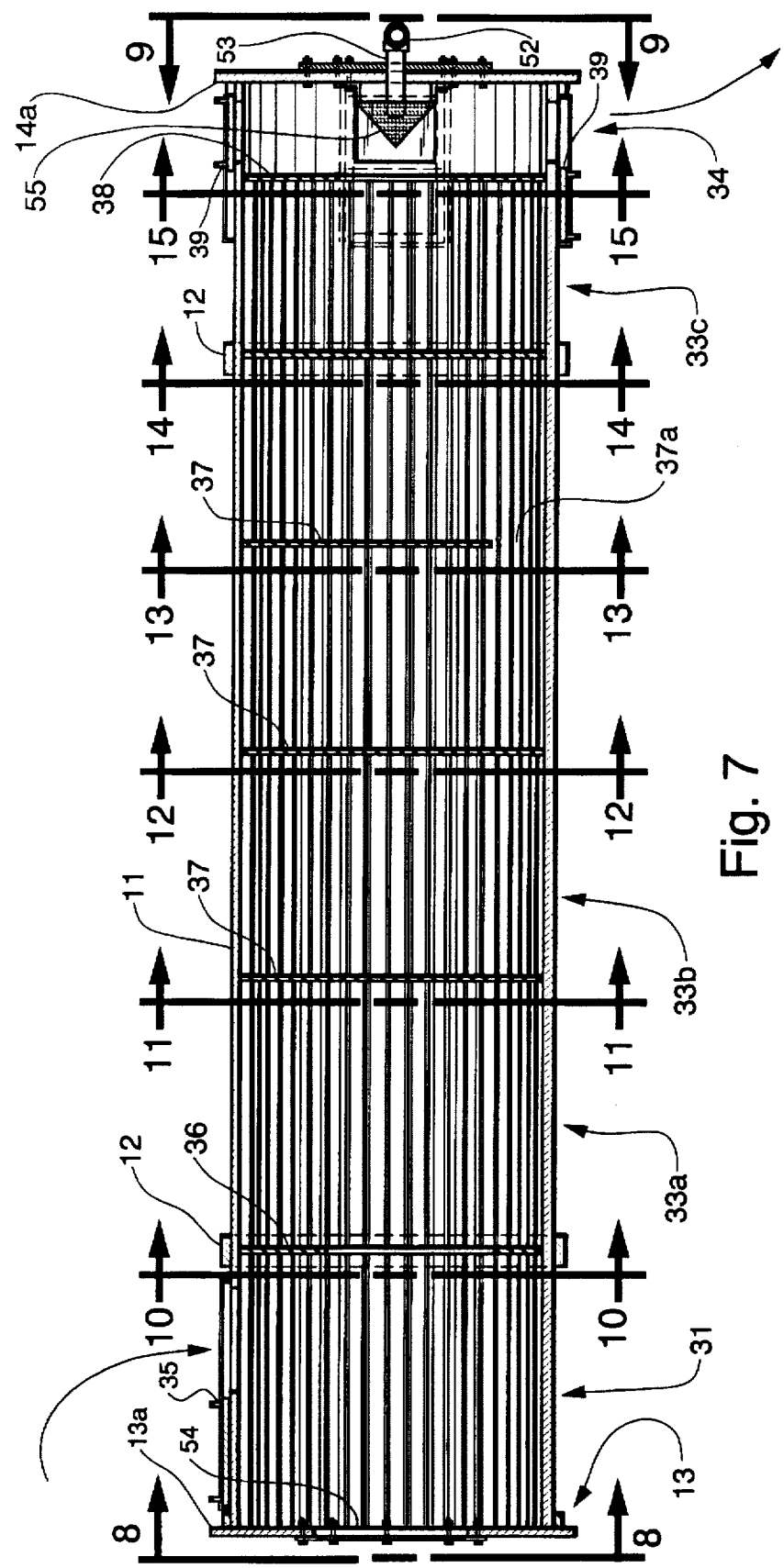
FIG. 7 is a cross-sectional view of the rotary composter vessel taken along lines 7—7 of FIG. 1, all drive mechanism and mobile trailer frame supports have been removed for purposes of clarity.
Figure 8:
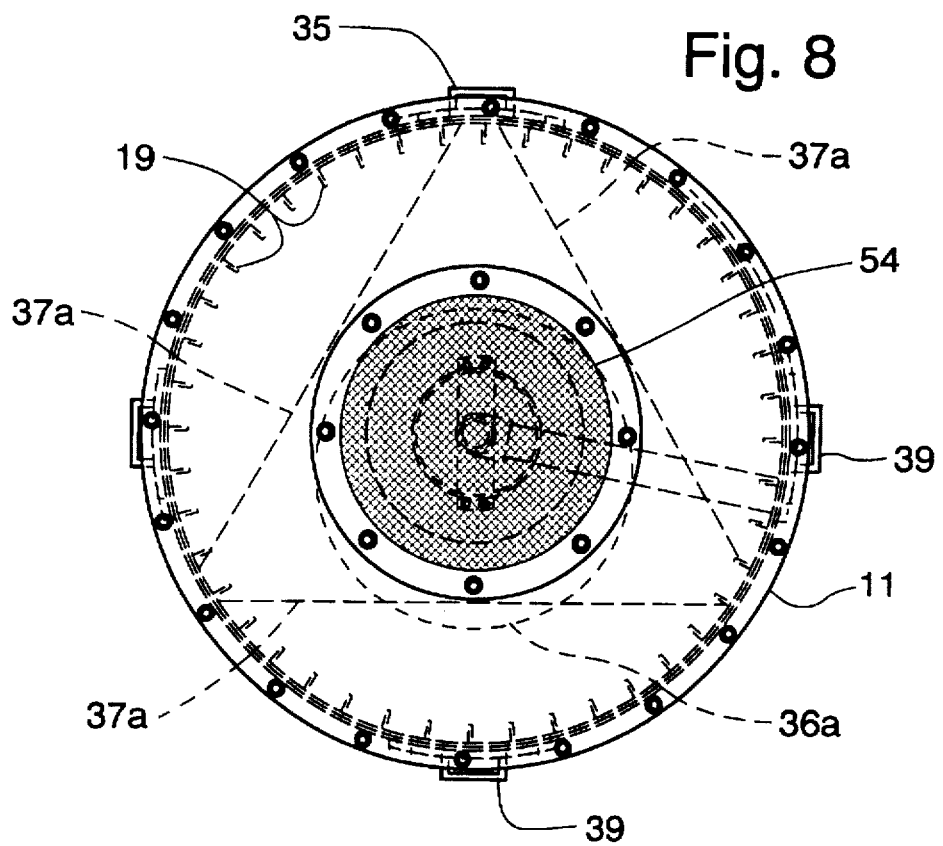
FIG. 8 is an enlarged elevational end view of the infeed end of the rotary composter vessel corresponding to lines 8—8 of FIG. 7.
Figure 9:
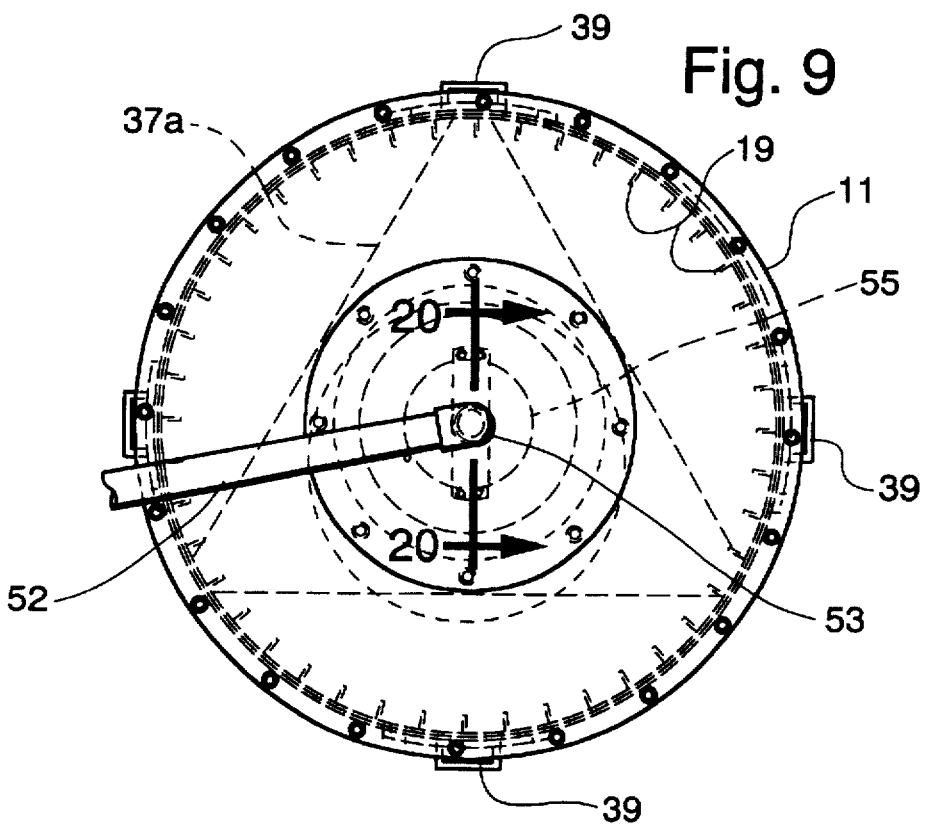
FIG. 9 is an enlarged elevational end view of the discharge end of the rotary composter vessel corresponding to lines 9—9 of FIG. 7.
Figure 20:
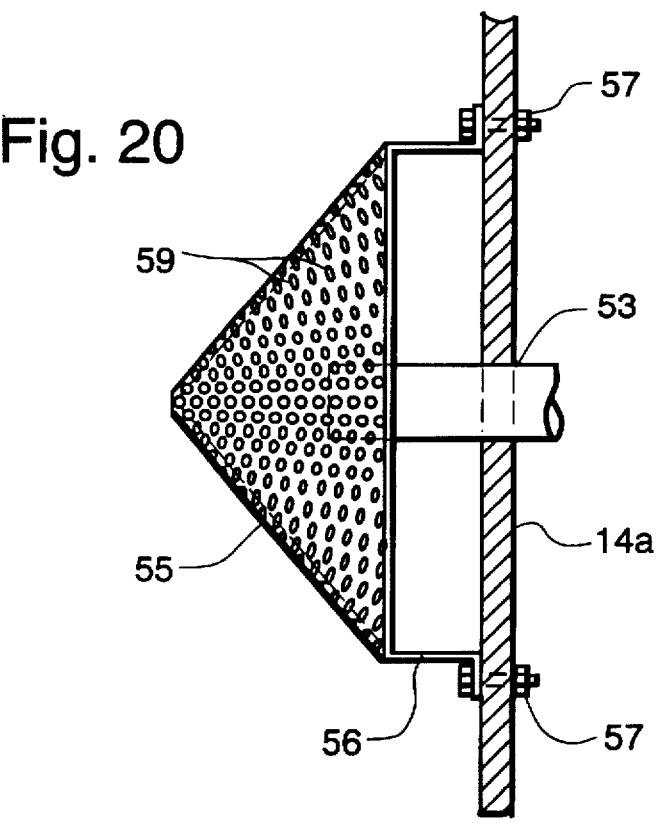
FIG. 20 is an enlarged side elevational detail view of the diffuser cone forming part of the air inlet mechanism at the discharge end of the rotary composter vessel.
Figure 21:
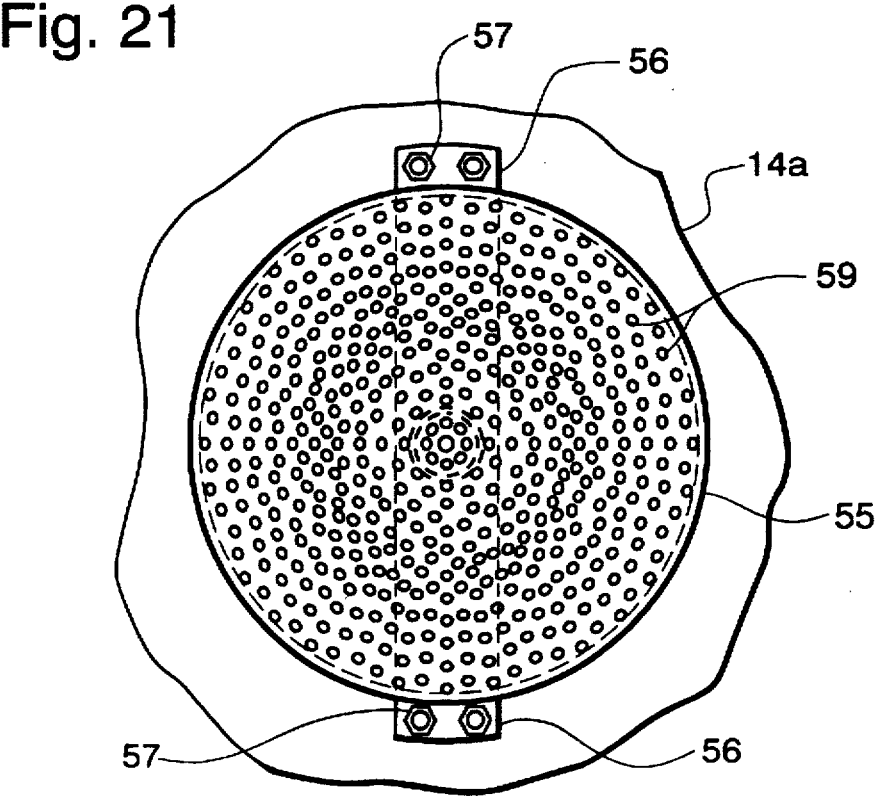
FIG. 21 is a front elevational detail view of the diffuser cone shown in FIG. 20.

Referring now to FIGS. 1, 2 and 7, it can be seen that the vessel 12 is divided into a series of discrete compartments. Beginning at the infeed end 13, the first vessel compartment 31 is defined as the space between the end wall 13a of the vessel 11 and the first baffle 36 and is adapted for receiving the material to be composted. The first or infeed compartment 31 is provided with an access door 35 formed within the exterior circumference of the vessel 11 to permit the introduction of material within the infeed compartment 31 to be composted. The access door 35 is preferably slidable between an opened position and a closed position to prevent the spilling of material from the infeed compartment 31 as the vessel 11 rotates.

The last compartment 34 at the discharge end 14 of the vessel 11 is defined as the space between the discharge end wall 14a and the last baffle 38. The last or discharge compartment 34 is provided with four discharge doors 39 equally spaced around the circumference of the vessel 12. The discharge doors 39 are also preferably of the slidable variety that can be moved between opened and closed positions to control the discharge of compost therefrom. The opening of the discharge doors 39 will allow the compost within the discharge compartment 38 to spill therefrom as the vessel 11 is rotated. Between the infeed compartment 31 and the discharge compartment 38, the vessel 11 is divided into a plurality, preferably four, digesting compartments 33 separated by an interior baffle 37.

Referring now to FIGS. 7 and 10-15, it can be seen that the interior baffles are constructed as a truncated disc that covers approximately 85 percent of the cross-sectional area of the vessel 11. The passageway 37a formed by the missing segment of the circular disc-like baffle 37 is oriented 120 degrees out of phase with the immediately succeeding or preceding baffle 37. Looking first at FIG. 11, it can be seen that the passageway is oriented at an azimuth of approximately 60 degrees, while the next passageway depicted in FIG. 12 is located at an azimuth of approximately 300 degrees. Likewise, the next two interior baffles, as depicted in FIGS. 13 and 14, have the passageway oriented at an azimuth of approximately 180 degrees and back at 60 degrees, respectively.

Referring now to FIG. 10, it can be seen that the first baffle 36 is preferably constructed with an eccentric opening 36a through the center of the baffle. The eccentric opening 36a forms a weir that prevents all of the material from moving from the first compartment 31 into the adjacent first digesting compartment 33a. As a result, a portion of the microbes that effect the composting activity within the vessel 11 will be retained within the infeed compartment 31 to inoculate the material subsequently introduced through the infeed opening 35 to start the composting process before the material even moves into the first digesting compartment 33a. Similarly, the last baffle 38 has a concentric opening 38a therethrough to provide a weir to retain a microbial inoculant within the last digesting compartment 33d, thereby insuring that the digesting compartments contain at least a minimum supply of microbes to hasten the digesting or composting process.

Referring now to FIGS. 16 through 19A, one skilled in the art will realize the manner in which the interior baffles 37 restrict the flow of material through the vessel 11. FIGS. 16–19 reflect any one of the interior baffles 37 as they rotate with the rotation of the vessel 11. Looking at the situation in FIG. 16, the vessel 11 is presumed to be substantially full with a void 40 at the upper left corner of the vessel 11 which is in a dynamic state due to the angle of repose of the material and the counterclockwise rotation of the vessel 11, as viewed in FIG. 16. The arrows in FIG. 16 reflect the movement of the material in response to the rotation of the vessel 11. Arrow 41 indicates that material is sloughing over as the material overcomes it angle of repose. The passageway 37a formed by the missing arc segment of the baffle 37 is located at the bottom of the vessel 11, but since material is positioned on both sides of the baffle 37, as depicted in FIG. 16A, material does not pass from one side of the baffle to the other.

The situation is essentially the same in FIG. 17 as in FIG. 16, except that the passageway 37a is now rotated to the upper right quadrant of the vessel 11, but has not yet overlapped the void 40. Accordingly, as reflected by the arrow 42 in FIG. 17 and by the arrows in FIG. 17A, the material continues to slough over into the void 40 against the baffle 37 without passing into the next digesting compartment 33.

FIG. 18 represents the continued rotation of the vessel 11 to position the passageway 37a in a location substantially overlapping the void 40 at the upper left quadrant of the vessel 11. As depicted by the dotted arrow 43 in FIG. 18 and the dotted arrow 44 in FIG. 18A, the material sloughing over the angle of repose into the void 40 can fall through the passageway 37a, past the interior baffle 37 and into the succeeding digesting compartment 33. Once the passageway 37a rotates past the area of the void 40 in which material sloughs over the angle of repose, as represented in FIGS. 19 and 19A, the sloughing material becomes blocked by the baffle 37 and is prevented from passing into the succeeding digesting compartment 33.

Accordingly, one skilled in the art will recognize that only small amounts of material in one digesting compartment 33 pass into the succeeding digesting compartment 33 on each revolution of the vessel 11. Further since the speed of rotation of the vessel 11 is in the order of a half of a revolution or less per minute, one skilled in the are will recognize that the vessel 11 can retain material within the rotating vessel 11 for three or more days from the time it is fed into the infeed compartment 31 and is discharged from the discharge compartment 34.

Referring now to FIGS. 1, 7–9 and 20–21, the air infeed mechanism 50 can best be seen. A supply of ambient air is fed into the discharge compartment 34 to be pushed through the vessel 11 to exit at the screened opening 54 in the infeed opening 31. The staggered arrangement of the interior baffles 37, as described above, requires that the air fed into the discharge compartment 34 will necessarily follow a serpentine path to reach the infeed compartment 31. The spiraled movement of air through the vessel 11 facilitates the interaction of the air through the material within the digesting compartments 33. The direction of the flow of air through the vessel 11 is opposite to the direction of material flow through the vessel 11 in order to reduce the temperature of the material within the discharge compartment 34 and to transfer heat into the digesting compartments 33.

A blower 51 supported on the trailer frame 15 forces air through the pipe 52 that extends around the exterior of the vessel 11 to the center of the discharge end 14 of the vessel 11 to inject air into the discharge compartment 34. The pipe 52 passes through and is sealed against the discharge end wall 14a to terminate a short distance from the discharge end wall 14a into the discharge compartment 34 to define an air infeed port 53. The pipe 52 is fixed relative to the frame 15 and the vessel 11 rotates relative to the pipe 52.

The air infeed port 53 is surrounded by an air diffuser 55 formed as a cone pointed at the infeed end 13 of the vessel 11. The diffuser 55 is formed with a plurality of holes 59 therein to allow the passage of air therethrough from the air infeed port 53 which terminates near the center of the conical shape of the diffuser 55. The symmetrical conical shape of the diffuser 55 presents a uniform surface to the material accumulated within the discharge compartment 34 during the rotation of the vessel 11. The diffuser 55 is provided with a mounting bracket 56 that is detachably connected to the discharge end wall 14a by connectors 57.

By presenting a sloped surface to the material accumulated within the discharge compartment 34 and a spaced distance away from the discharge end wall 14a, material will not significantly accumulate on the diffuser 55. Furthermore, the holes 59 formed in the diffuser 55 are of a size to prevent the passage of large particles or clumps of material from passing through the diffuser 55 and plugging the air infeed port 53. Any material passing through the holes 59 can either pass back through the opposing holes 59 or slide off the interior sloped surface of the diffuser 55 to pass between the diffuser 55 and the discharge end wall 14a. As a result, material will not accumulate within the diffuser 55 to plug the air infeed port 53.

Preferably, the vessel 11 is approximately seven feet in diameter and approximately thirty-four feet in length. The vessel 11 is divided into six compartments, including the infeed compartment 31, the discharge compartment 34 and four interior digesting compartments 33. Preferably, the infeed compartment 31 will be the largest of the compartments and each subsequent compartment 33, 34 will be smaller in size such that the discharge compartment 34 is approximately half the size of the infeed compartment 31. Each interior baffle 37 is provided with a passageway 37a formed by a missing segment that measures approximately one and a half feet along the radius of the vessel 11.

The interior surface of the vessel 11 is provided with a plurality of circumferentially spaced lifter ribs 19 that extend radially into the interior of the vessel 11 about one and one half inches and are spaced apart about six inches around the circumference. When the vessel 11 is rotating, the segmented openings 37a offset around the circumference of the vessel 11 act like a large screw. As the lifter ribs 19 elevate the material in small increments through the passageways 37a into the subsequent compartment 33 on each rotation of the vessel 11. The weir formed by the central opening 38a in the last baffle 38 maintains a level of material within the vessel 11 to ensure that none of the compartments 33 can be completely emptied so that an inoculum is retained in each compartment to provide a staged microbiological culture for each of the compartments.

Air is supplied by a semi-pressure blower 51 to a center connection with the discharge end wall 14a. When the discharge doors 39 are closed, the vessel 11 is substantially sealed so that air is forced through the composting materials in the successive compartments 34, 33, 31 to be discharged through the screened opening 54. The direction of the flow of air is counter to the direction of the flow of the composting material through the vessel 11. Since the successive passageways 37a are circumferentially offset by 120 degrees, the air must move down through one passageway 37a and then around to the next passageway 37a and so on until passing through all four digesting compartments 33. Furthermore, the lifter ribs 19 elevate the composting material at the passageways 37a when overlapping the void 40 past the angle of repose, incorporating air as the material sloughs over in the void 40.

The time of passage of material through the vessel 11 is of critical importance. The material within the digesting compartments must achieve thermophylic temperatures, i.e. approximately 150 degrees F., although the material discharged from the discharge compartment may have temperatures reduced to the mesophilic range, i.e. less than 100 degrees F. Start-up procedures will include the passage of the initially introduced materials back into the infeed compartment for re-processing until the materials have reached the thermophylic temperatures and the composting of the materials has been completed. Once the start-up procedure has been completed, material need only pass through the vessel 11 one time, provided that thermophylic temperatures have been achieved.

An equipment failure that disrupts the composting process, such as a failure in the drive mechanism 20, may require a modified start-up or recovery procedure to be utilized to achieve the aggressive composting of the material. An interruption of the operation of the composter 10 as short as three days will require the use of a recovery procedure to re-establish the aggressive composting process. Likewise, regular infeed of new materials to be composted is necessary to maintain the aggressive composting process. The failure to add fresh materials for two days has caused a decline in the composting activity.

For rapid composting, three factors for the materials to be composted must be considered: the carbon nitrogen ratio, the moisture content and the void space within the material. Since the composter 10 is designed to create a robust tumbling action, the void space is created during the operational process. To optimize the composting process, the carbon nitrogen ratio should be in the range of 30 to 1. Each possible input material has a different carbon to nitrogen ratio and the ratio varies widely between materials. In the way of example, the carbon to nitrogen ratios of the following materials have been found to be: cattle manure at about 19; paper in the range of 127 to 178; activated sewage sludge at 6; digested sewage sludge at 16; fruit waste in the range of 20 to 49; horse manure in the range (depending on bedding) of 22 to 56; hay at 15 to 32; straw at 48 to 150; wood chips within the range of 212 to 1,313; and grass clippings at about 17.

Straight carbon to nitrogen ratio is not the only aspect to the proper operation of the composter 10, as availability of the elements, particularly carbon, must also be taken into consideration. Carbon in the form of lignin and cellulose is largely unavailable to the microbes in the short time frame of the composting process utilized in the composter 10. As a result, wood chips, even though a high carbon material, can only be used substantially as a bulking agent. Likewise, straw and shredded paper cannot be included in any formulation as having available carbon content.

With respect to moisture content, nearly all materials used in the composter 10 will have a high moisture content. The goal for optimum composting is to have to have the moisture content at 60% or less in the first two digesting compartments 33a, 33b. Preferably, the material fed into the infeed compartment 31 should have a moisture content of less than 50% because the flow of air through the digesting compartments 33 will carry increasing levels of moisture as the air temperature rises as it passes through the digesting compartments where the material is at a thermophylic range, but moisture condenses out of the air as it cools upon entry into the infeed compartment. If the material to be composted is high in moisture, such as cattle manure, it is preferable to have a sufficient supply of dry bulking materials, such as wood chips or paper.

Typically, the composter 10 would utilize several materials in a recipe to provide the most efficient composting operation. For example, digested sewage sludge is low in volatile solids and energy so that it is unable to generate as robust a composting process as cattle manure; therefore, a material with a high, readily available energy is needed to mix with the sewage sludge if such is the principal material to be composted.

Figure 22:
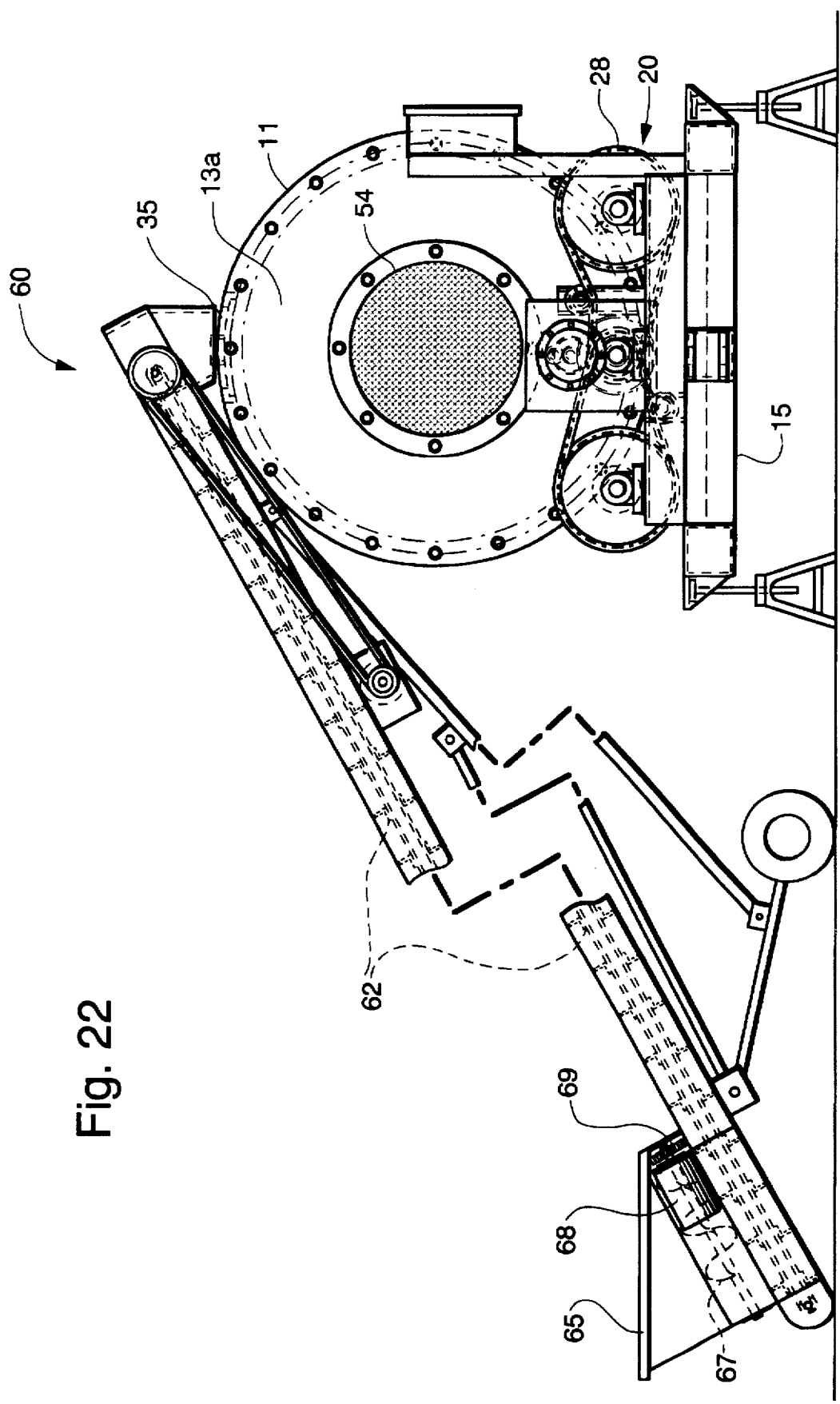
FIG. 22 is an elevational end view of the rotary composter having a loading elevator positioned to deliver waste material into the infeed end of the rotary composter vessel, the central portions of the loading elevator being broken away for purposes of clarity.
Figure 23:
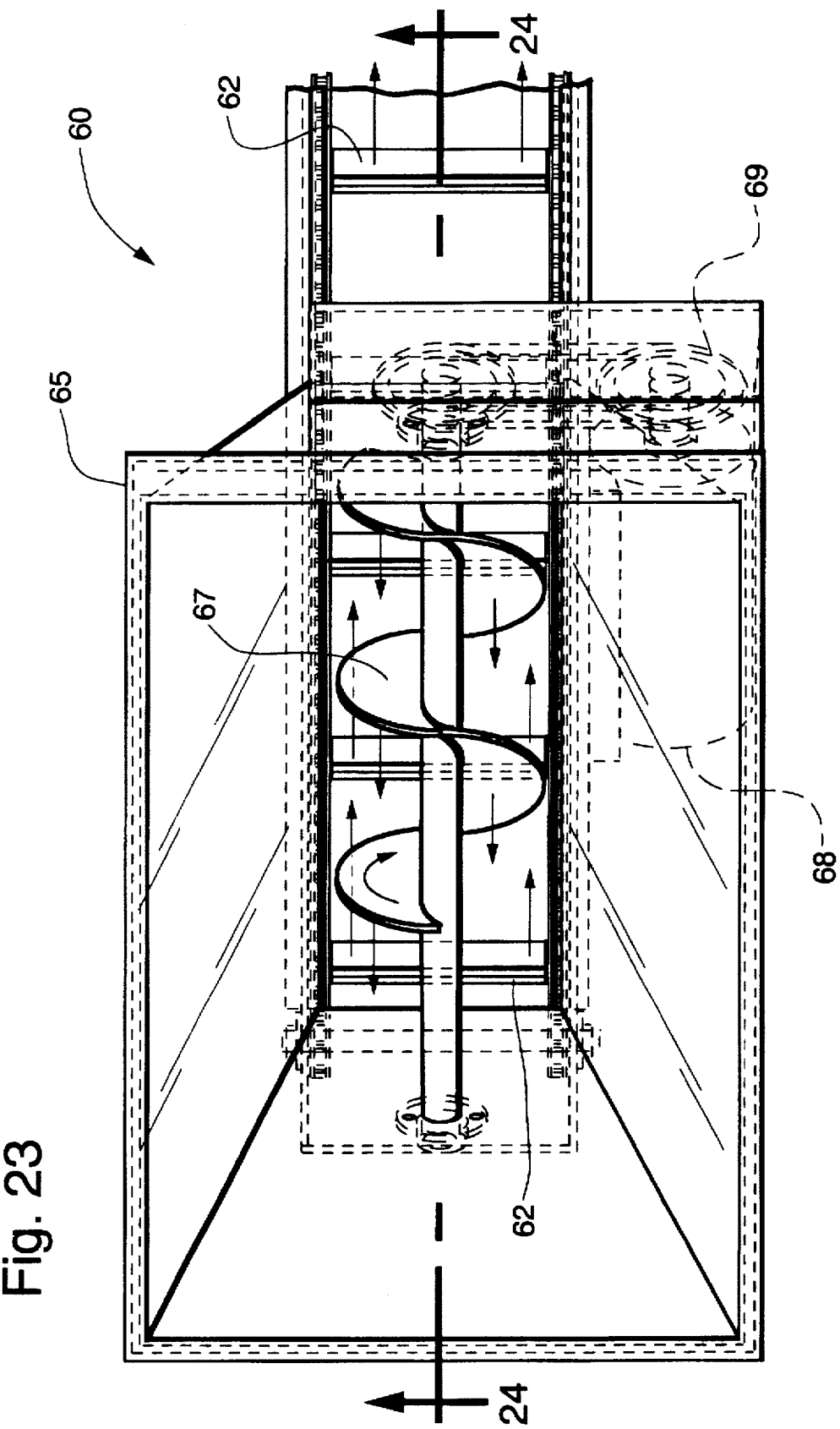
FIG. 23 is a top plan view of the mixing hopper forming part of the loading elevator shown in FIG. 22, the arrows being utilized to indicate the direction of movement of the material within the mixing hopper.
Figure 24:
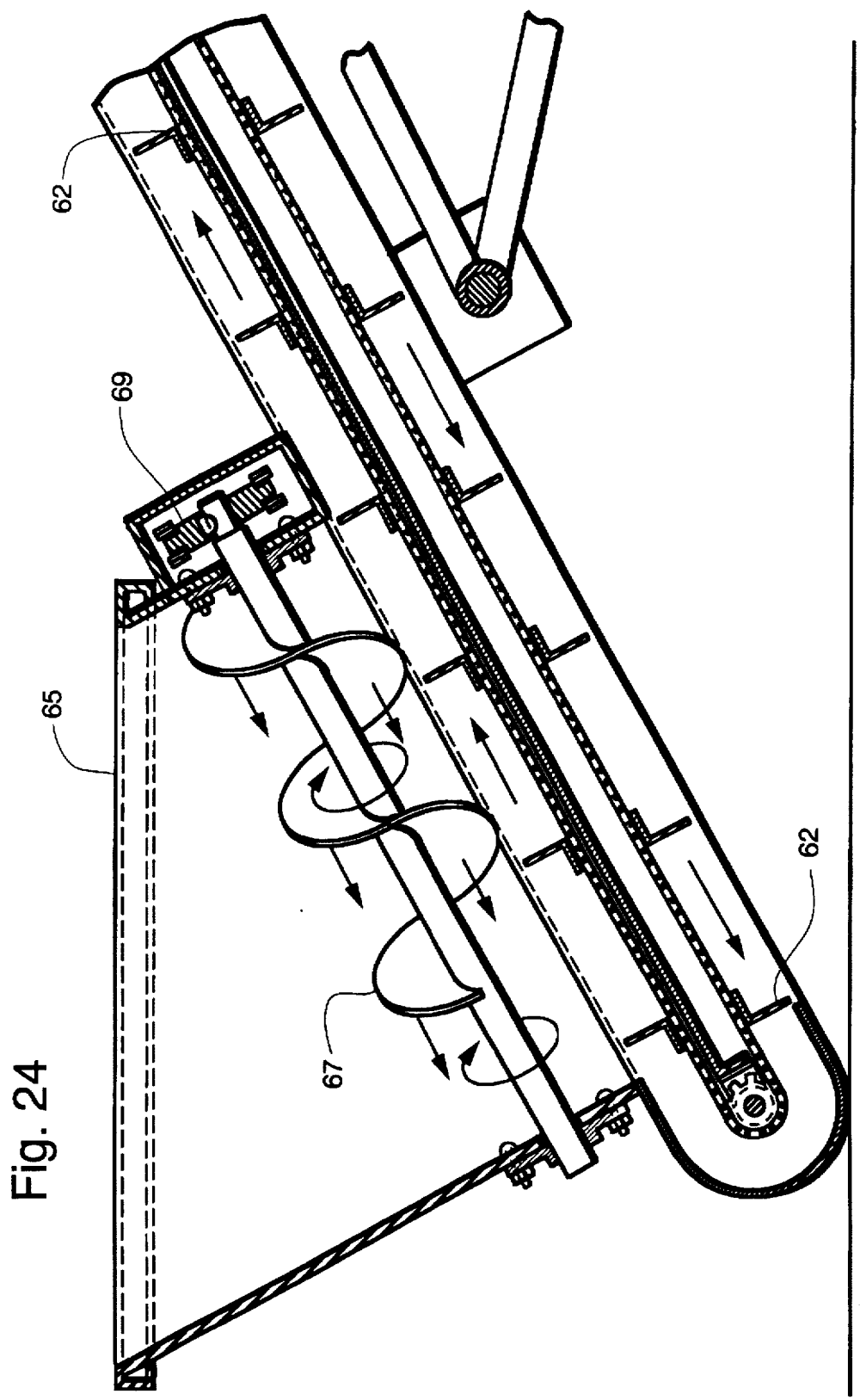
FIG. 24 is a cross-sectional view of the loading elevator and mixing hopper taken along lines 24—24 in FIG. 23, the arrows being used to indicate the direction of movement of the various components.

Referring now to FIGS. 22–24, the loading elevator 60 utilized to mix materials to be fed into the infeed compartment 31 can best be seen. The loading elevator 60 is primarily a conventional slatted manure elevator 62 with a mixing hopper 65 mounted thereon to mix and shred materials within the hopper 65. The mixing hopper 65 is provided with a rotatable mixing auger 67 rotatably mounted above the slatted conveyor 62. The mixing auger is driven by a motor 68, preferably electrical, through a drive mechanism 69 to rotate the auger 67 to convey material within the hopper 65 opposite to the direction the slatted conveyor 62 is moving material toward the infeed compartment 31 of the vessel 11.

The V-shaped hopper 65 funnels the material placed therein toward the mixing auger 67 that is rotated to move material in the direction opposite to the direction of movement of the slatted conveyor 62 which is movable immediately beneath the mixing auger 67. These opposite directions of movement between the mixing auger 67 and the slatted conveyor 62 effect a shredding of the material and a mixing of the material within the hopper 65 as the material is drawn into the auger at one end and pushed up at the opposing end. In operation, different materials used in the composting recipe are dumped into the hopper and mixed by the auger 67 and conveyed to the opened infeed door 35 stopped at the top of the vessel 11.

Figure 25:
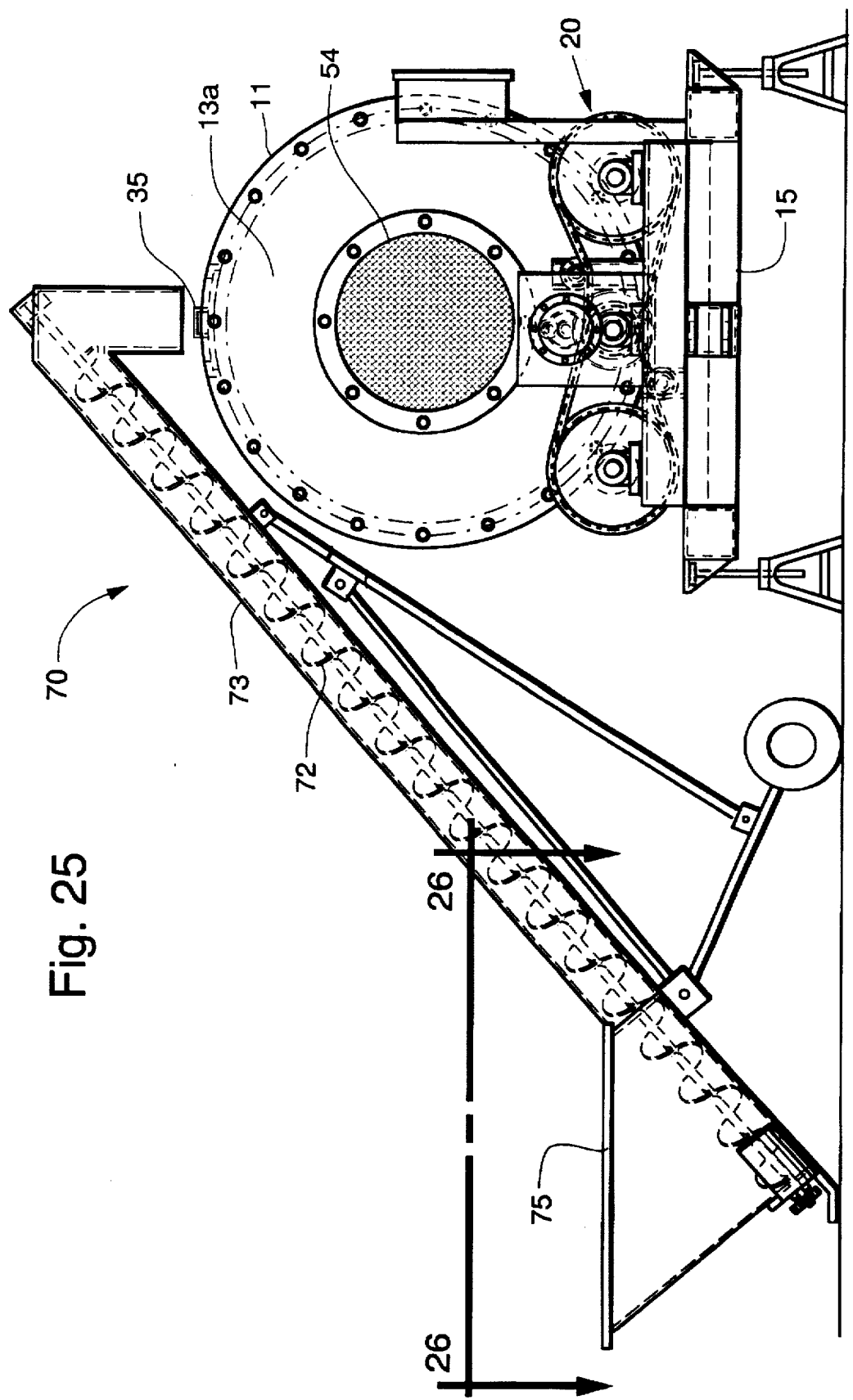
FIG. 25 is an elevational end view of the rotary composter having an alternative loading elevator positioned to deliver waste material into the infeed end of the rotary composter vessel.
Figure 26:
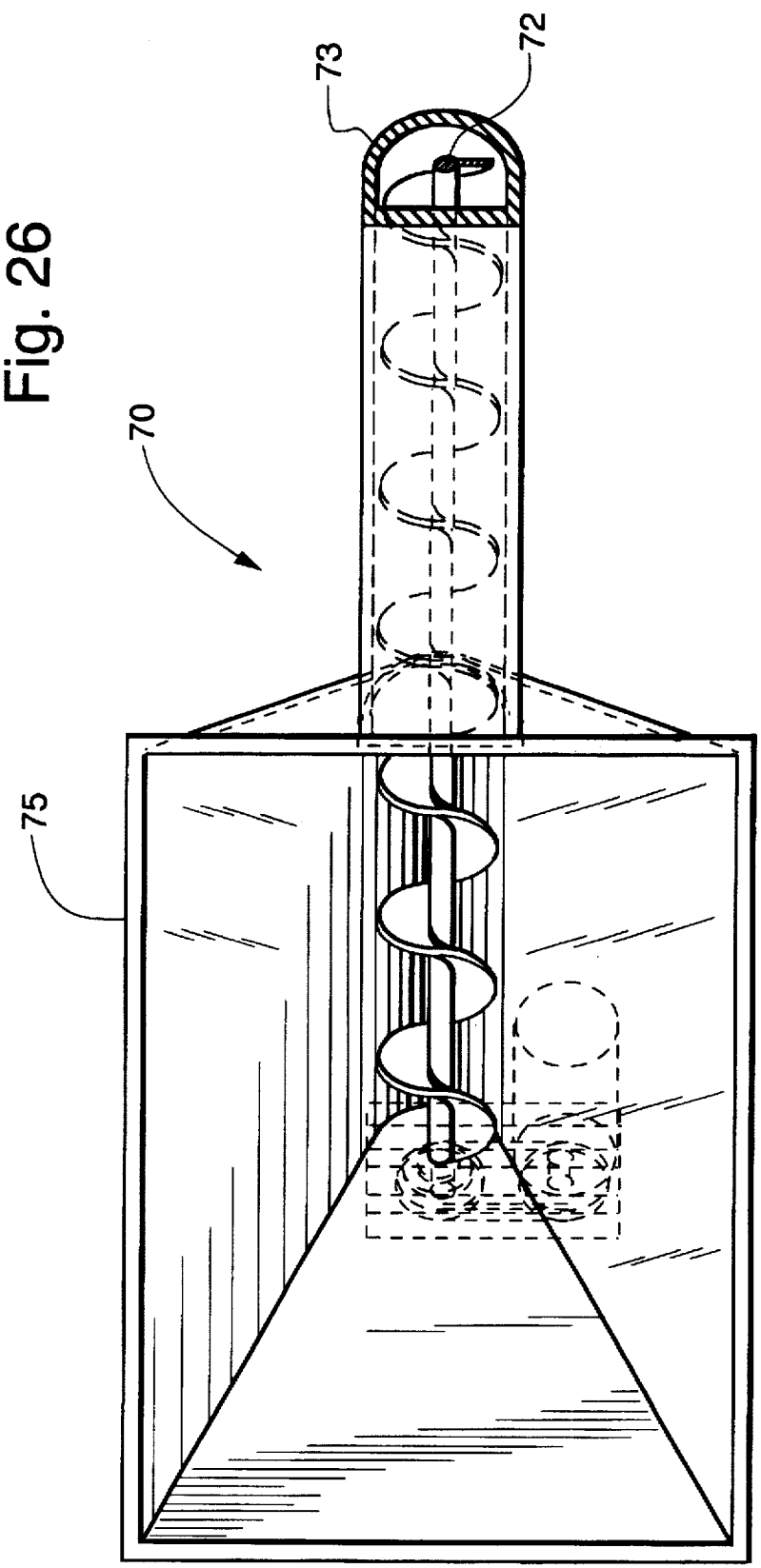
FIG. 26 is a top plan view of the mixing hopper forming part of the alternative loading elevator corresponding to lines 26—26 in FIG. 25.

An alternative configuration of the loading elevator 70 can be seen in FIGS. 25 and 26. The mixing hopper 75 is formed of a deep V-shape, having steep inclined sidewalls that funnels material placed therein toward a delivery auger 72 which is rotated against a closed top, U-shaped trough 73 to convey material to the opened infeed door 35 positioned at the top of the vessel 11. This combination has been found to provide an adequate mixing of alternating scoops of different materials placed into the mixing hopper 75, while effecting the transport thereof to the vessel for discharge into the infeed compartment 31 of the vessel 11.

In operation, the material to be composted, according to the recipe of materials developed to provide the most efficient combination of materials for composting, are deposited into the loading elevator 60, 70 for conveyance to the infeed compartment 31 through the opened infeed door 35 of the vessel 11. The rotation of the vessel 11 would be stopped with the infeed door 35 positioned at the top of the vessel 11 beneath the appropriately positioned loading conveyor 60, 70. Preferably, the different materials to be used in the composting process will be placed into the hopper 65, 75 in alternating fashion to enhance the mixing of the materials before being discharged into the vessel 11.

After the infeed compartment 31 is substantially filled, the drive mechanism 20 is re-started to rotate the vessel 11 on the drive rollers 22. As described above, material within the infeed compartment 31 will pass through the opening 36a in the first weir baffle 36 into the first digesting compartment 33a. Passage from the first digesting compartment 33a to the second digesting compartment 33b, and then the subsequent digesting compartments 33, occurs in a relatively slow fashion as only small amounts of material can pass through the passageways 37a formed in the interior baffles 37 on each revolution of the vessel 11. The air infeed mechanism 50 is operated to blow air into the vessel 11.

While the material is within the vessel 11 and working its way through the digesting compartments 33 toward the discharge compartment 34, microbes are digesting the material in a known manner to reduce the material into compost. This conversion of material into compost also involves a substantial reduction in the volume of the material such that there this possibly 50% less material by volume discharged from the vessel 11 than in fed into the infeed compartment 31. The composting process generates substantial heat, preferably thermophylic temperatures near 150 degrees F. To retain the heat within the vessel 11, the entire circumference of the vessel (except for the traction bands 12) is coated with a layer of insulation, preferably a four inch layer of urethane foam.

The first time the composter 10 is started, the first materials fed through the vessel 11 will not likely reach the thermophylic stage and will require re-introduction into the infeed compartment 31, preferably mixed into fresh material to be composted. Once the composter 10 is running continuously and thermophylic temperatures are maintained, the raw material fed into the infeed compartment 31 will be completely converted into compost by the time the material reaches the discharge compartment 34, approximately three days later.

In a test of material retention time, a dozen tennis balls were added to the material fed into the infeed compartment 31. One of the balls was discharged in two days; one ball was discharged in three days; three balls were discharged in four days; three balls were discharged in five days; two balls were discharged in six days; and the remaining balls were discharged after the passage of six days. One skilled in the art will recognize that the retention time of the material can be selectively varied by varying the speed of rotation of the vessel 11. Accordingly, maintenance of thermophylic temperatures can be controlled through a variation of both the speed of rotation of the vessel 11 and the rate at which air is blown into the vessel 11.

Material can be discharged from the discharge compartment 34 during rotation of the vessel 11 simply by opening the discharge doors 39 and collecting the material discharged therefrom. Preferably, a second conveyor (not shown) will be positioned to collect the discharged compost and convey the compost to a preselected location for cool down and subsequent disposition. For compost formed from animal wastes, the nitrogen in the compost is fixed and the compost can be spread directly onto the fields without fear of contamination of the water supply from runoff or leaching into the ground water.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a rotary composter having a vessel rotatably supported for rotation about a longitudinal axis and having an infeed end, a discharge end and a cylindrical outer wall, said vessel being divided into compartments by longitudinally spaced baffles, including an infeed compartment, a remote discharge compartment and a plurality of intermediate digesting compartments, said rotary composter being operable to move material from said infeed compartment through said digesting compartments to said discharge compartment; drive means operably associated with said vessel for rotation thereof about said longitudinal axis; and an air infeed means for forcing a flow of air through said vessel, the improvement comprising:

said air infeed means including an air diffuser having a conical shape so as to present a sloped surface to material irrespective of the rotated position of said vessel.

2. The rotary composter of claim 1 wherein said air diffuser is provided with a plurality of holes to permit the passage of air therethrough.

3. In a rotary composter having a vessel rotatably supported for rotation about a longitudinal axis and having an infeed end, a discharge end and a cylindrical outer wall, said vessel being divided into compartments by longitudinally spaced baffles, including an infeed compartment, a remote discharge compartment and a plurality of intermediate digesting compartments, said rotary composter being operable to move material from said infeed compartment through said digesting compartments to said discharge compartment; drive means operably associated with said vessel for rotation thereof about said longitudinal axis; and an air infeed means for forcing a flow of air through said vessel, the improvement comprising:

said air infeed means including an air diffuser having a conical shape so as to present a sloped surface to material irrespective of the rotated position of said vessel said air diffuser is provided with a plurality of holes to permit the passage of air therethrough said air infeed means includes a blower and a conduit operatively associated with said blower for directing air to an air infeed port in said discharge end of said vessel, said air diffuser being positioned to receive a flow of air from said air infeed port.

4. The rotary composter of claim 3 wherein said air diffuser is supported on a bracket mounted to a discharge end wall at said discharge end of said vessel to support said air diffuser at a position spaced outwardly from said end wall.

5. The rotary composter of claim 4 wherein said air infeed port extends through said discharge end wall and terminates in the interior of said air diffuser.

6. A rotary composter comprising:

a frame;

a hollow vessel rotatably supported on said frame for rotation about a longitudinal axis, said vessel being defined by a generally cylindrical outer wall and having an infeed end wall oriented above a remote lower discharge end wall, said vessel being divided into a plurality of compartments, including:

an infeed compartment at said infeed end wall and being provided with an access opening for loading material into said infeed compartment;

a discharge compartment at said discharge end wall and being provided with discharge openings for removing material from said discharge compartment; and a plurality of successive digesting compartments positioned between said infeed compartment and said discharge compartment;

a baffle separating adjacent said compartments within said vessel, each of said baffles having a passageway to permit the passage of material to the lower adjacent compartment;

drive means for rotating said vessel; and air infeed means for introducing a flow of air through said vessel, including:

a blower;

a conduit connected to said blower to receive a flow of air therefrom, said conduit terminating at an air infeed port passing through said discharge end wall; and an air diffuser cone mounted to said discharge end wall adjacent said air infeed port so that the flow of air discharged from said air infeed port passes through said air diffuser cone.

7. The rotary composter of claim 6 wherein said air diffuser cone is connected to a mounting bracket affixed to said discharge end wall such that said diffuser cone is spaced from said discharge end wall.

8. The rotary composter of claim 7 wherein said air diffuser cone has a surface having a plurality of openings therethrough, said air diffuser cone being mounted such that said surface is sloped with respect to horizontal irrespective of the rotated position thereof to prevent material from accumulating on said surface.

9. The rotary composter of claim 8 wherein said air infeed port extends through said discharge end wall and terminates in the interior of said air diffuser.

* * * * *